(12) United States Patent
Thorson et al.

(10) Patent No.: US 8,070,366 B1
(45) Date of Patent: Dec. 6, 2011

(54) OPTICAL FIBER CONNECTOR AND METHOD

(75) Inventors: Kevin J. Thorson, Eagan, MN (US);
Roger J. Karnopp, Eagan, MN (US);
Gregory M. Drexler, Minnetonka, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 172 days.

(21) Appl. No.: 12/467,398

(22) Filed: May 18, 2009

(51) Int. Cl.
*G02B 6/38* (2006.01)

(52) U.S. Cl. .................................. 385/59; 356/237.1
(58) Field of Classification Search ............... 385/59; 356/237.1
See application file for complete search history.

(56) References Cited

U.S. PATENT DOCUMENTS

| | | | | |
|---|---|---|---|---|
| 3,922,064 A * | 11/1975 | Clark et al. | ............ | 385/54 |
| 4,738,508 A * | 4/1988 | Palmquist | ............ | 385/78 |
| 4,753,510 A * | 6/1988 | Sezerman | ............ | 385/61 |
| 4,889,406 A * | 12/1989 | Sezerman | ............ | 385/35 |
| 4,953,941 A * | 9/1990 | Takahashi | ............ | 385/72 |
| 5,028,112 A * | 7/1991 | Holmberg et al. | ............ | 385/58 |
| 5,082,378 A * | 1/1992 | Muller et al. | ............ | 385/72 |
| 5,282,259 A * | 1/1994 | Grois et al. | ............ | 385/84 |
| 5,937,121 A * | 8/1999 | Ott et al. | ............ | 385/59 |
| 6,048,104 A * | 4/2000 | Ohkubo et al. | ............ | 385/78 |
| 6,056,448 A | 5/2000 | Sauter et al. | | |
| 6,085,003 A | 7/2000 | Knight | | |
| 6,206,581 B1 * | 3/2001 | Driscoll et al. | ............ | 385/78 |
| 6,276,843 B1 * | 8/2001 | Alcock et al. | ............ | 385/90 |
| 6,322,257 B1 | 11/2001 | Kryzak | | |
| 6,371,658 B2 * | 4/2002 | Chong | ............ | 385/59 |
| 6,442,318 B1 * | 8/2002 | Goldman | ............ | 385/114 |
| 6,685,363 B2 | 2/2004 | Kryzak | | |
| 6,872,008 B2 * | 3/2005 | Takeda et al. | ............ | 385/60 |
| 6,923,578 B2 * | 8/2005 | Betker et al. | ............ | 385/55 |
| 7,014,369 B2 * | 3/2006 | Alcock et al. | ............ | 385/57 |
| 2002/0041043 A1 * | 4/2002 | Park et al. | ............ | 264/1.24 |
| 2004/0013394 A1 * | 1/2004 | Norland | ............ | 385/137 |
| 2005/0041241 A1 * | 2/2005 | Pahk et al. | ............ | 356/237.1 |
| 2006/0251360 A1 * | 11/2006 | Lu et al. | ............ | 385/88 |
| 2010/0080517 A1 * | 4/2010 | Cline et al. | ............ | 385/92 |

* cited by examiner

*Primary Examiner* — Charlie Peng
*Assistant Examiner* — Peter Radkowski
(74) *Attorney, Agent, or Firm* — Hamre, Schumann, Mueller & Larson, P.C.

(57) ABSTRACT

An optical fiber connector and a method of forming an optical fiber connector are described where the optical fiber connector has low eccentricity tolerance at each end of the connector. Optical interconnection can be made at both ends of the connector, with the low eccentricity tolerance at each end providing improved light transmission at each interconnection. The connector is formed by using two commercially available, off-the-shelf connector members. Each connector member has a first end with a low eccentricity tolerance and a second end that allows for a fiber optic cable termination. The two connectors are connected together back-to-back, so that the second ends face each other and the first ends are disposed at opposite ends of the connector. The size of the connector can also be easily adjusted to make it shorter or longer.

16 Claims, 3 Drawing Sheets

OPTICAL FIBER CONNECTOR AND METHOD

FIELD

This disclosure relates to an optical fiber connector and a method of forming an optical fiber connector.

BACKGROUND

In optical fiber connections, optical interconnections alignment is important in order to maximize the light transmission. The term that describes the tolerance of the expected geometric true position of an optical ferrule relative to an alignment feature, such as an alignment pin, is eccentricity.

FIG. 1 illustrates a conventional optical fiber connector 2 known as a uniferrule. One example of a uniferrule is available from US Conec Ltd. of Hickory, N.C. A uniferrule is an optical fiber connector that is capable of making optical interconnection at each end. One end of the connector 2 connects to an optical pigtail 4. The other end of the connector 2 connects to an active optical component 6, for example a transceiver, on a circuit board 8.

In conventional uniferrule-type optical fiber connectors, it is understood that the eccentricity tolerance at the end that connects to the optical pigtail is less than the eccentricity tolerance at the opposite end that connects to the active optical component.

SUMMARY

An optical fiber connector and a method of forming an optical fiber connector are described where the optical fiber connector has low eccentricity tolerance at each end of the connector. Optical interconnection can be made at both ends of the connector, with the low eccentricity tolerance at each end providing improved light transmission at each interconnection. Moreover, the size of the connector can be easily adjusted to make it shorter or longer to accommodate differing applications that require differently sized connectors.

The connector is formed by using two commercially available, off-the-shelf connector members. In the specific example described herein, these connector members are typically used as fiber optic cable termination ends. Each connector member has a first or front end with a low eccentricity tolerance. The opposite or second end allows for a fiber optic ribbon cable termination. The two connector members are then connected together back-to-back, so that the second ends face each other and the first ends are disposed at opposite ends of the resulting connector. The resulting connector is a uniferrule and has low eccentricity tolerance at each end, with each end being available for optical interconnection with improved light transmission.

As used herein, the term "low" in low eccentricity tolerance is not intended to be limited to any particular or specific value of eccentricity tolerance. Rather, the term "low" is used as a relative term to mean that the eccentricity tolerance of the first or front end is lower relative to the eccentricity tolerance of the second or back end of a standard off-the-shelf uniferrule.

The length of the connector between the opposite ends can be adjusted to accommodate different applications that require connectors of different lengths. For example, the length can be increased by installing a spacer between the facing second ends of the two connector members. Alternatively, the length can be decreased by cutting one of the connector members adjacent, for example, the second end, thereby reducing the length of the cut connector member between the first and second ends thereof, which results in a reduction of the length of the resulting connector when the two connector members are connected back-to-back.

The resulting connector is a uniferrule construction having optical interconnectivity with low eccentricity tolerance at each end. The concepts described herein can be used with a number of different types of optical fiber connector members including, but not limited to, MT connector members, or any two connector members where, when the two connector members are connected back-to-back, the resulting connector has optical connectivity and low eccentricity tolerance at each end of the now joined connector members.

DRAWINGS

DETAILED DESCRIPTION

An optical fiber connector is formed by using two commercially available, off-the-shelf optical fiber connector members. Each connector member has a first or front end with a low eccentricity tolerance and a second or opposite end that allows for a fiber optic ribbon cable termination. The two connector members are then connected together back-to-back, so that the second ends face each other and the first ends are disposed at opposite ends of the resulting connector. The resulting connector is a uniferrule design that has low eccentricity tolerance at each end, with each end being configured for optical interconnection, for example to a mating connector and an optical component, with improved light transmission.

Figure 1:
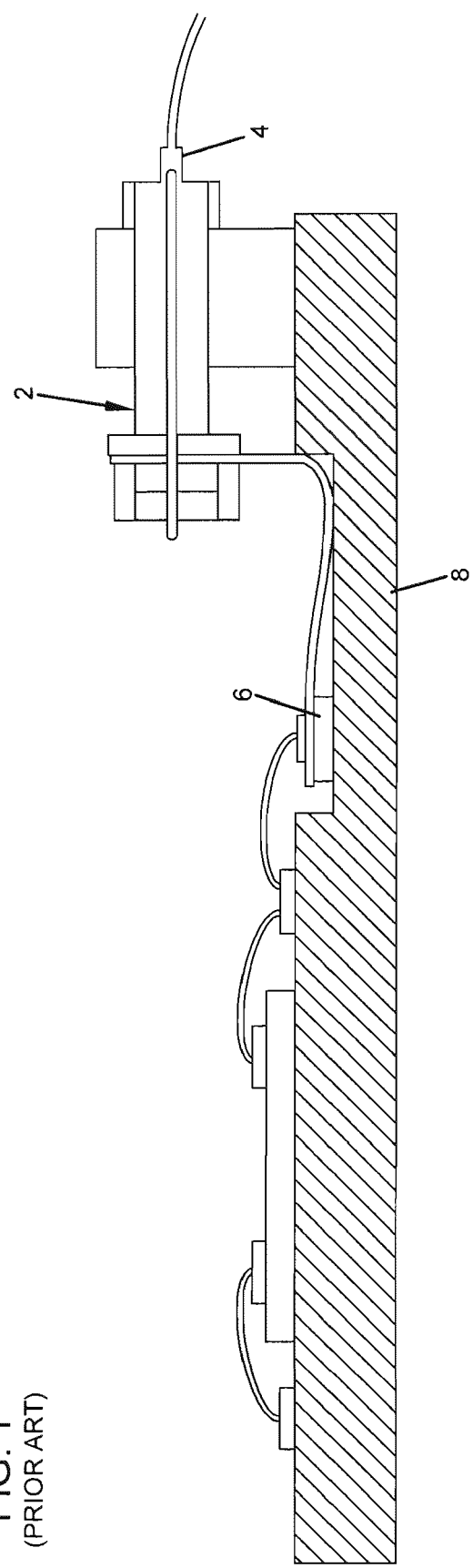
FIG. 1 illustrates a conventional uniferrule connector in use in an optical circuit.
Figure 2:
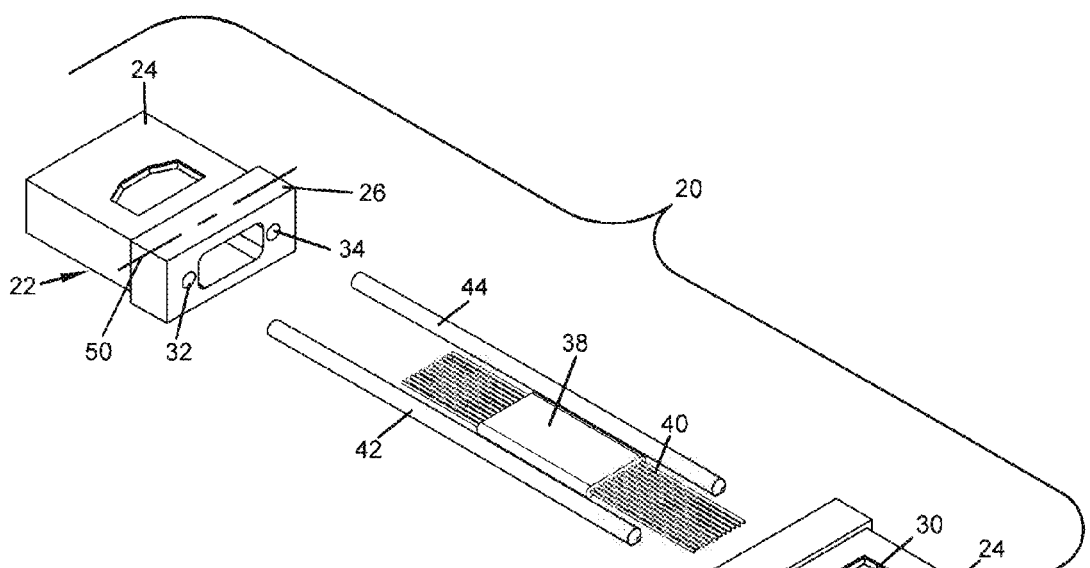
FIG. 2 is an exploded view of the optical fiber connector with the two connector members prior to connection.
Figure 3:
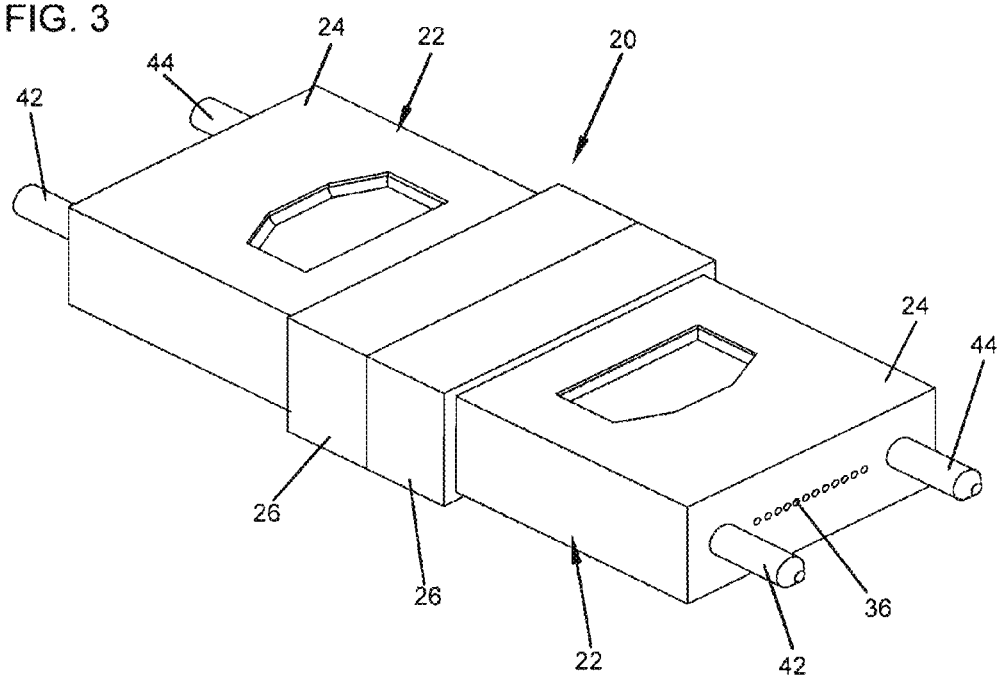
FIG. 3 shows the two connector members connected to form the optical fiber connector.

With reference now to FIGS. 2 and 3, an optical fiber connector 20 is illustrated that is constructed from two commercially available, off-the-shelf optical fiber connector members 22. The connector members 22 can be any two optical fiber connectors used in optical fiber systems, where each connector member 22 includes a first or front end 24 with a low eccentricity tolerance and a second or back end 26 configured for fiber optic ribbon cable termination.

An example of connector members that can be used are MT connectors which are well known to those of ordinary skill in the art, and the connector members 22 will be described as MT connectors. However, other connector members that meet the requirements for the connector members 22 described herein can be used as well. Each connector member 22 includes a housing 28 and a body cavity 30 formed inside the housing. Alignment holes 32, 34 extend through the housing 28 from the end 24 to the end 26. The end 24 of each connector member 22 also includes fiber ferrules 36 that receive ends of optical fibers so as to mate with corresponding optical fiber ends on a mating optical connector or other optical component.

A plurality of optical fibers 38, for example in a ribbon style, interconnect the connector members 22. The fibers 38 are provided with a jacket, and portions of the jacket at the ends are removed to expose ends 40 of the fibers 38 that are to be connected to the fiber ferrules 36. The number of optical fibers used can vary depending upon the optical system the connector 20 is used with. For example, MT connectors using four, eight, twelve and twenty-four optical fibers are known. A small amount of epoxy is placed on each ferrule opening and when the ends 40 of the fibers are inserted into the ferrules 36, the fibers pull the epoxy into the ferrules to help secure the fibers in the ferrules.

Guide pins 42, 44 extend through the alignment holes 32, 34 of the housing. The guide pins serve to mechanically couple the connector members 22 to each other. In addition, the ends of the guide pins can extend past either end 24, as illustrated in FIG. 3, for insertion within corresponding holes in the mating connector and/or other optical component.

FIG. 3 illustrates the two optical fiber connector members 22 connected together to form the optical fiber connector 20. The connector members 22 are connected back-to-back so that the second ends 26 face each other and the first ends 24 with the low eccentricity tolerance are disposed at opposite ends of the connector 20. The result is a quick and easy connector 20 that permits optical interconnection at each end with low eccentricity tolerance at each end providing improved light transmission at each interconnection.

To form the connector 20, the connector members are oriented in the manner shown in FIG. 2. The jacket is removed from each end of the fibers 38 to expose the fiber ends 40. The fiber ends 40 are then connected to the ferrules 36, and the connector members brought together back-to-back. A potting compound can be injected into the body cavities 30 to fill up empty space and encapsulate the fibers 38. The pins 42, 44 can then be installed in the openings 32, 34. Ends of the fibers that project past the ferrules can be trimmed and the ferrules are then polished to ready them for optical interconnection.

The connector 20 can be easily adjusted in length to accommodate different connector length requirements. One way to adjust the length is by cutting one or both of the connector members 22 adjacent, for example, the end 26 to reduce the length of the cut member 22 between the ends 24, 26. For example, with reference to FIG. 2, the connector member 22 can be cut along the cut-line 50. Alternatively, or in addition, the other connector member 22 can be cut along the cut-line 50 shown in FIG. 4.

Figure 4:
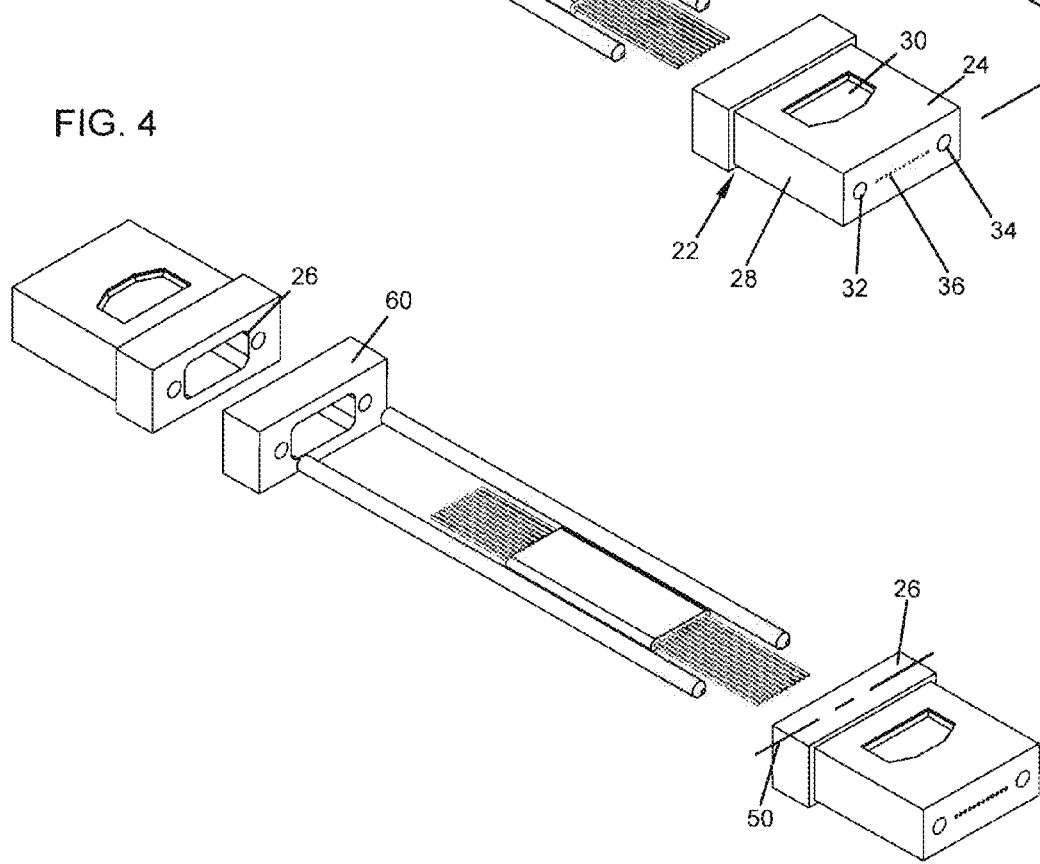
FIG. 4 is an exploded view similar to FIG. 2 with a spacer installed between the connector members.
Figure 5:
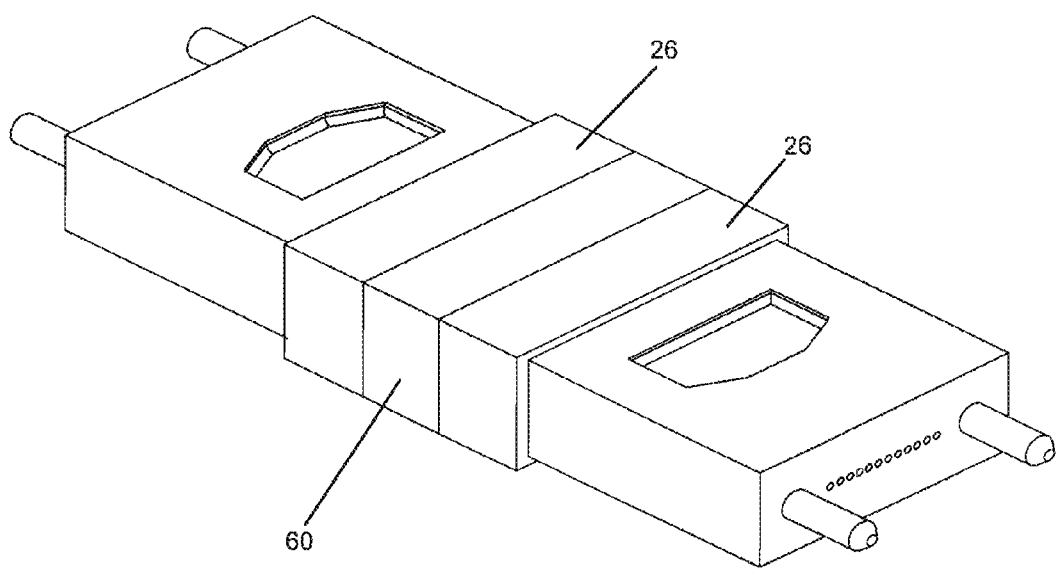
FIG. 5 shows the assembly of FIG. 4 with the connector members and spacer connected to form the optical fiber connector.

The connector 20 can also be increased in length. With reference to FIGS. 4 and 5, a spacer 60 can be inserted between the ends 26 of the connector member 22. The spacer 60 spaces the ends 26 of the connector members 22 from each other, thereby increasing the distance between the first ends 24. The size of the spacer 60 can be tailored to meet a specific length for the connector 20. Multiple spacers could also be used to meet the length requirement.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An optical fiber connector, comprising:
 a first optical fiber connector member and a second optical fiber connector member, the first and second optical fiber connector members each having a first end with a first eccentricity tolerance and a second end, each of the first ends is configured for optical connectivity; and
 a plurality of optical fibers interconnecting the first and second optical fiber connector members, the optical fibers each having ends configured to achieve optical connectivity,
 wherein the first optical fiber connector member is connected to the second optical fiber connector member so that the second ends face each other and the first ends are disposed at opposite ends of the optical fiber connector;
 the first and second optical fiber connector members each include a housing defining a body cavity between the first and second ends and having an opening at the second end thereof, the openings face each other and are aligned with each other so that the plurality of optical fibers extend through the openings and the body cavities and extend to the respective first ends;
 each first end includes ferrules configured to receive the ends of the plurality of optical fibers so that the plurality of optical fibers extend between the ferrules of the first optical fiber connector member and the ferrules of the second optical fiber connector member.

2. The optical fiber connector of claim 1, further comprising guide pins interconnecting the first and second optical fiber connector members.

3. The optical fiber connector of claim 2, wherein the guide pins extend through the housings from the first end of the first optical fiber connector member to the first end of the second optical fiber connector member.

4. The optical fiber connector of claim 1, further comprising a spacer that spaces the second end of the first optical fiber connector member from the second end of the second optical fiber connector member.

5. The optical fiber connector of claim 1, wherein each of the first and second optical fiber connector members is an MT connector.

6. A method comprising:
 connecting a first optical fiber connector member to a second optical fiber connector member, where the first and second optical fiber connector members each have a first end with a first eccentricity tolerance and being configured for optical connectivity, and a second end, and the first and second optical fiber connector members are connected so that the second ends face each other and the first ends are disposed at opposite ends of the optical fiber connector; and
 connecting the first and second optical fiber connector members so that ferrules at the first end of each of the first and second optical fiber connector members are interconnected by a plurality of optical fibers extending between the ferrules, wherein the optical fibers each have ends received by the ferrules and configured to achieve optical connectivity, the first and second connector members each include a housing defining a body cavity between the first and second ends and having an opening at the second end thereof, the opening face each other and are aligned with each other so that the plurality of optical fibers extend through the openings and the body cavities and extend to the respective first ends.

7. The method of claim 6, comprising interconnecting the first and second optical fiber connector members with guide pins extending through the housings from the first end of the first optical fiber connector member to the first end of the second optical fiber connector member.

8. The method of claim 6, comprising adjusting the distance between the first ends.

9. The method of claim 8, wherein adjusting the distance comprises installing a spacer to space the second end of the first optical fiber connector member from the second end of the second optical fiber connector member, thereby increasing the distance between the first ends.

10. The method of claim 8, wherein adjusting the distance comprises cutting at least one of the first optical fiber connector member and the second optical fiber connector member adjacent the second end thereof to reduce the distance between the first end and the second end of the optical fiber connector member that is cut, thereby decreasing the distance between the first ends.

11. The optical fiber connector of claim 1, wherein the optical fibers are provided with a jacket between the ends of the optical fibers.

12. The optical fiber connector of claim 1, wherein the second ends each have a second eccentricity tolerance, the first eccentricity tolerance is lower than the second eccentricity tolerance.

13. The method of claim 6, wherein the the optical fibers are provided with a jacket between the ends of the optical fibers.

14. The method of claim 6, wherein the second ends each have a second eccentricity tolerance, the first eccentricity tolerance is lower than the second eccentricity tolerance.

15. The optical fiber connector of claim 1, wherein the first and second optical connector members each have alignment holes extending through the respective housing from the first end to the second end thereof, and the alignment holes of the first optical connector member are aligned with the alignment holes of the second optical connector member at the second ends.

16. The optical fiber connector of claim 3, wherein the guide pins extend past the first ends of the first and second optical fiber connector members to permit insertion into holes of mating connectors.

* * * * *